May 2, 1967 R. O. RAGAN ETAL 3,317,114

TRAYS

Filed March 2, 1965

INVENTORS
ROBERT O. RAGAN
JEROME F. OLSON
BY Robert M. Dunning
ATTORNEY

United States Patent Office 3,317,114
Patented May 2, 1967

3,317,114
TRAYS
Robert O. Ragan, Minneapolis, and Jerome F. Olson, South St. Paul, Minn., assignors to Waldorf Paper Products Company, Ramsey County, Minn., a corporation of Minnesota
Filed Mar. 2, 1965, Ser. No. 436,558
2 Claims. (Cl. 229—30)

This invention relates to an improvement in trays and deals particularly with a tray or carton made of material such as sheet polystyrene foam and which is provided with heat sealed joints.

During recent years, the production of materials such as plastic sheeting has developed to a point where some of this sheeting is competitive with paperboard from a standpoint of cost, and has certain advantages over paperboard. The materials such as foamed polystyrene sheet are waterproof and greaseproof and, accordingly, cartons and trays made of this material are very effective for packing such items as cookies, bacon, fresh meats, nuts, and baked goods of various types. The material also is very effective for use in forming liquid-holding vessels of one type or another if the joints or seams are effectively sealed. For example, cups having generally rectangularly arranged side walls may be used for containing hot liquid such as coffee, and the material forming the receptacle acts as an insulating material so that the receptacle may be easily handled.

Sheet material of this type has been vacuum-molded into numerous shapes and forms, and, in the past, this has been the usual method of forming objects. However, vacuum-forming methods are very slow as compared with the production of paperboard objects. In other words, the techniques used in the handling of sheet material in the paperboard industry are much faster than the vacuum-molding techniques. Accordingly, trays and the like which are formed from die cut blanks on apparatus similar to that used for forming paperboard trays may be somewhat less expensive than vacuum-formed objects, due to the speed with which the objects may be formed.

We have found that through the use of a suitable method and apparatus, trays may be inexpensively formed with the abutting edges of the side wall fused together by the application of heat. By folding the edges to be used on opposite sides of a thin heated blade for a short period of time and then withdrawing the blade and bringing the heated edges together, the edges will fuse together to form a liquid-tight joint. In view of the fact that the sealing of the edges requires but a very short period of time, the process may be carried on very quickly, making it possible to form trays at a considerably higher rate of speed than is practical in a vacuum-molding operation. The present invention resides in a tray-like body having a bottom wall and a series of side walls hingedly connected to the bottom wall, and having abutting edges of the side walls fused together to form a liquid-tight joint.

These and other objects and novel features of the present invention will more clearly and fully set forth in the following specification and claims.

In the drawing forming a part of the specification,

Figure 1:
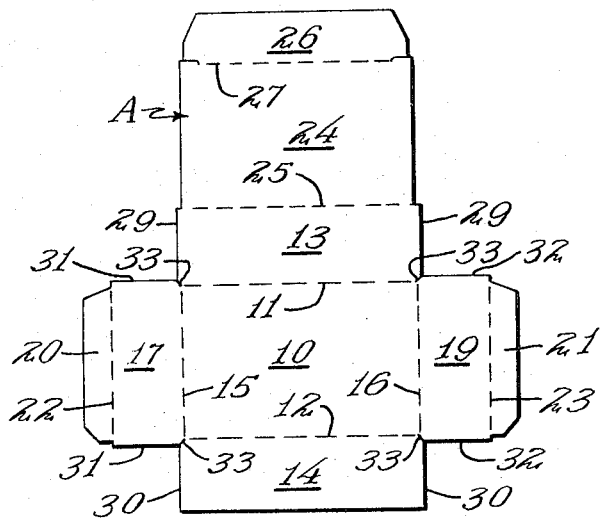
FIGURE 1 is a diagrammatic view of a typical blank from which the receptacle is formed.

The blank A is designated to form a tray with a hinged cover. Obviously, this particular form of a tray is only shown for the purposes of illustration. As will be understood, the hinged cover and end wall flanges may be eliminated if an open-topped tray is desired. The carton illustrated also discloses side walls which are at right angles to the bottom panel. Trays may similarly be produced with outwardly inclined side and end walls so that the trays may nest together for storage purposes.

The tray A includes a bottom panel 10 of rectangular form which is hingedly connected along parallel fold lines 11 and 12 to a rear wall 13 and front wall 14, respectively. The remaining opposed edges of the bottom panel 10 are connected along parallel fold lines 15 and 16 to end walls 17 and 19, respectively. The fold lines 15 and 16 usually intersect the fold lines 11 and 12 at right angles.

End wall flanges 20 and 21 are foldably connected to the upper edges of the end walls 17 and 19, respectively, along fold lines 22 and 23. The flanges 20 and 21 are designed to fold down to a common plane and to underlie the cover panel in closed condition of the tray cover. The tray cover 24 is hingedly connected to the upper edge of the rear wall 13 along a fold line 25. A tuck flap 26 is hingedly connected to the forward edge of the cover panel 24 along a fold line 27. The cover panel 24 is substantially the same size as the bottom panel 10 and the tuck flap 26 is designed to fold between the forward edges of the end wall flanges 20 and 21, and the front wall 14 when the carton is closed.

As will be noted from an examination of FIGURE 1 of the drawings, the ends 29 of the rear wall 13, as well as the ends 30 of the front wall 14 extend beyond the fold lines 15 and 16. In other words, the front and rear walls are slightly wider than the bottom panel 10. In a similar way, the ends 31 of the end wall 17 and the ends 32 of the end wall 19 project somewhat beyond the fold lines 11 and 12 so that the end walls 17 and 19 are somewhat greater in horizontal length than the bottom panel 10. Short diagonal cut lines 33 emanate from the junctures between the parallel fold lines 11 and 12 and the parallel fold lines 15 and 16 to separate the extended portions of the front, rear, and end walls.

The reason for the extension of the various wall panels lies in the fact that the edges of these panels tend to draw back slightly when the edges are heated above the fusing temperature of the material. The blank is preferably formed of a material such as foamed polystyrene sheet which is usually somewhat thicker than paperboard which would be used for similar trays but the sheet material is thin enough so that it may be cut and creased on dies similar to those used in conjunction with paperboard.

Figure 3:
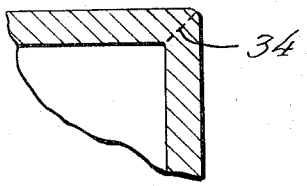
FIGURE 3 is an enlarged sectional view through a corner of the tray, showing the manner in which the abutting edges of the two walls are fused together.
Figure 2:
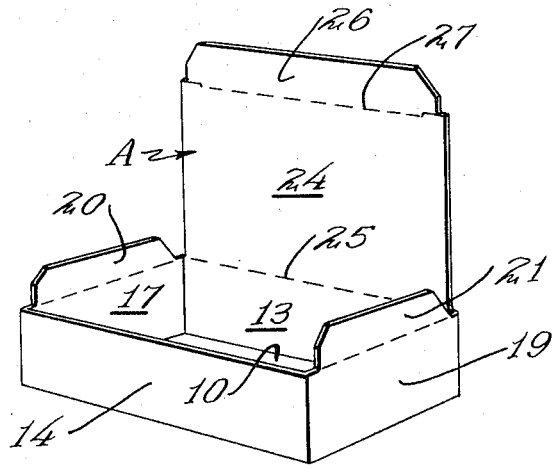
FIGURE 2 is a perspective view of the tray formed from the blank shown in FIGURE 1.

The trays are formed by heating the edges of the panels above the fusion temperature of the material, and bringing these edges together while the edges are still in a fusible state. We prefer to accomplish this result by folding the edges against opposite sides of a blade which has been heated to a point of the fusion temperature of the material, and then withdrawing the blade and pressing the edges together. The slightly extended ends of the wall panels draw back when heated to the extent necessary to form a right angular joint in the particular tray illustrated. The molten material along the edges of the wall fuses together to form an integral fused corner as illustrated in FIGURE 3 of the drawings, the actual joint between the two panels virtually losing its identity.

After the abutting edges have been cooled, the material forming the edges is solidly fused together. If a cross section is cut from a corner of the tray, and examined under a magnifying glass, a faint line of connection which is indicated by the dotted line 34 in FIGURE 3 of the drawings is barely visible. This line 34 extends diagonally of the corner as indicated. However, the two edges are securely fused together along the diagonal line 34, and mechanically-formed trays of polystyrene foam, which have been mechanically formed on a forming machine, produce a water-tight tray.

Foamed polystyrene sheet has been described as the sheet material used. However, foamed polypropylene sheet and foamed polyethylene sheet may also be used. Foamed thermoplastic sheet laminated to a skin of thermoplastic film to provide a gas barrier may also be successfully used. In other words, any foamed plastic sheet which is capable of having edges fused together in abutting relation may be employed. The present tray differs from structures in which surfaces of the sheet are sealed in face contact by being of sufficient thickness to permit the edges to be fused together. Foamed plastic sheet inherently has this property, while solid plastic sheet of sufficient thickness to permit its edges to be fused might not be folded on tray-forming equipment of the type normally used in forming paperboard trays.

Foamed polystyrene sheet may be used in densities of from two pounds per cubic foot to sixty-five pounds per cubic foot. The temperature at which the edges are fused varies depending upon the speed of operation, thickness of material, and other variables. However, the blades are heated to a temperature substantially above the melting point of the material employed.

In accordance with the patent statutes, we have described the principles of construction and operation of our tray; and while we have endeavored to set forth the best embodiment thereof, we desire to have it understood that obvious changes may be made within the following claims without departing from the spirit of our invention.

We claim:

1. A tray formed from a blank comprising a sheet of heat fusible foamed plastic cut and creased to provide:
   a bottom panel,
   front, rear, and end wall panels hinged to the edges of said bottom panel, cover and tuck flap panels hinged along the free edge of one of the panels,
   said front and rear wall panels being coextensive in length, said front and rear wall panels being of a length greater than the length of said bottom panel and extending equally beyond the hinges connecting said end wall panels to said bottom panel,
   said end wall panels being coextensive in length, said end wall panels being of a length greater than the width of said bottom panel and extending equally beyond the hinges connecting said front and rear wall panels to said bottom panel,
   edges of said panels at their intersection with said hinges being in abutting relation,
   said wall panels being folded into angular relation to said bottom panel with their beveled side edges in edge abutting relation,
   and said side edges are heated above the fusing temperature of the plastic, said edges are withdrawn slightly, and
   said withdrawn beveled abutting edges are fused together.

2. The structure of claim 1 and in which said sheet includes a skin of thermoplastic film laminated thereto.

References Cited by the Examiner

UNITED STATES PATENTS

| | | | |
|---|---|---|---|
| 1,691,736 | 11/1928 | Oppenheim. | |
| 2,379,500 | 6/1945 | Steffens | 156—322 |
| 2,589,022 | 3/1952 | Page et al. | 229—3.5 |
| 2,770,406 | 11/1956 | Lane | 229—3.5 |
| 2,862,543 | 12/1958 | Kaminsky | 156—306 |
| 2,917,217 | 12/1959 | Sisson | 229—3.5 |
| 2,956,310 | 10/1960 | Roop et al. | 229—3.5 |
| 3,189,243 | 6/1965 | Lux | 229—3.5 |
| 3,222,437 | 12/1965 | Schilling | 264—54 |

FOREIGN PATENTS 7,949 6/1907 Great Britain.

JOSEPH R. LECLAIR, Primary Examiner.

GEORGE O. RALSTON, Examiner.

D. T. MOORHEAD, Assistant Examiner.